April 3, 1928.  
W. E. WINE  
SIDE BEARING  
Filed Feb. 23, 1927  
1,664,445  
2 Sheets-Sheet 1

Inventor:
William E. Wine,
by Parker Cook.
Atty.

April 3, 1928.                            1,664,445
W. E. WINE
SIDE BEARING
Filed Feb. 23, 1927          2 Sheets-Sheet 2
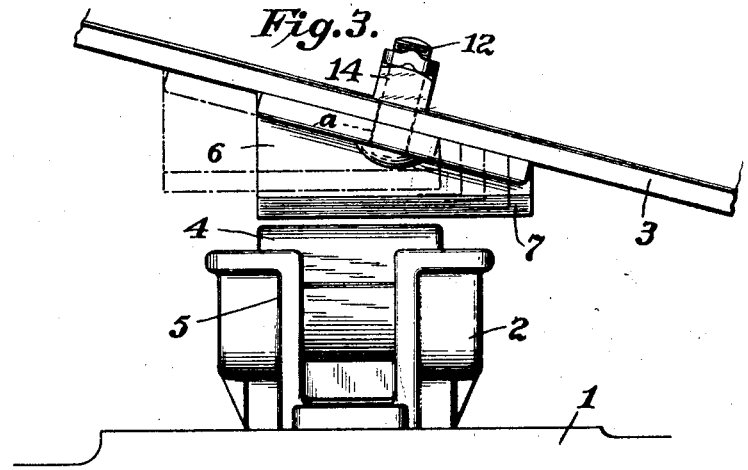
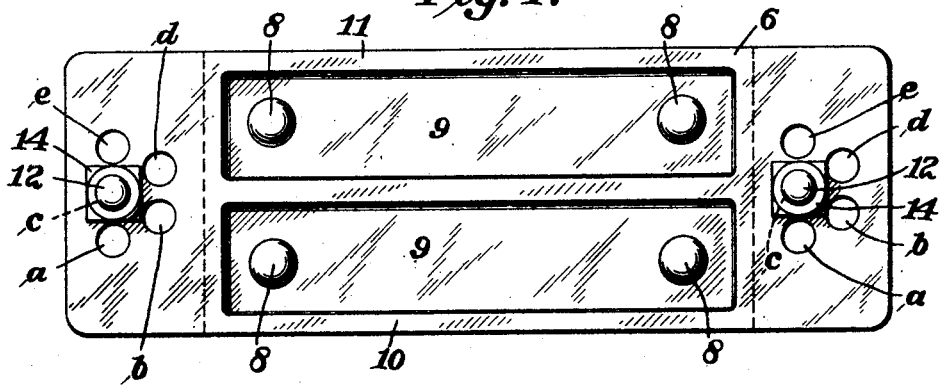
Inventor:
William E. Wine,
by Parker Cook.
Atty.

Patented Apr. 3, 1928.

1,664,445

UNITED STATES PATENT OFFICE.

WILLIAM E. WINE, OF TOLEDO, OHIO.

SIDE BEARING.

Application filed February 23, 1927. Serial No. 170,389.

My invention relates to new and useful improvements in side bearings, more especially to a type of side bearings wherein the body bearing may be adjusted from time to time with relation to the rollers, to thereby compensate for the settling of the bolster or the truck frames.

Still another object of the invention is to provide a type of side bearings, wherein the body bearing may be initially adjusted to compensate for any tolerance in the center plate of the truck bolster, or to compensate for any irregularities in the bolster or center plate.

Still another object of the invention is to provide a side bearing wherein the body bearing may be readily adjusted from time to time when found necessary and wherein the same is designed to be adjusted along the natural slope of the body bolster.

With these and numerous other objects in view, the invention consists in certain new and novel arrangements and combination of parts, as will be hereinafter more fully described and pointed out in the claims:

Referring now to the drawings showing a preferred embodiment:

Fig. 3 is a view similar to Fig. 1 and showing the different relative positions that the body bearing may assume.

Fig. 4 is a top plan view showing the body bearing and the several holes at its opposite ends for adjustment purposes.

Fig. 5 is a side view thereof showing the bolts through the ends, attaching it to the body bolster.

Figure 1:
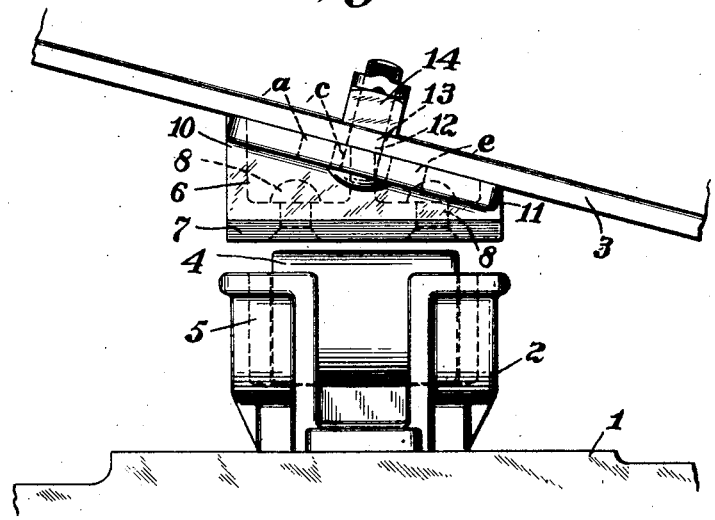
Fig. 1 is a fragmentary end elevation, showing the rollers mounted in the housing and the body bearing secured on the bottom of the sloping portion of the body bolster.
Figure 2:
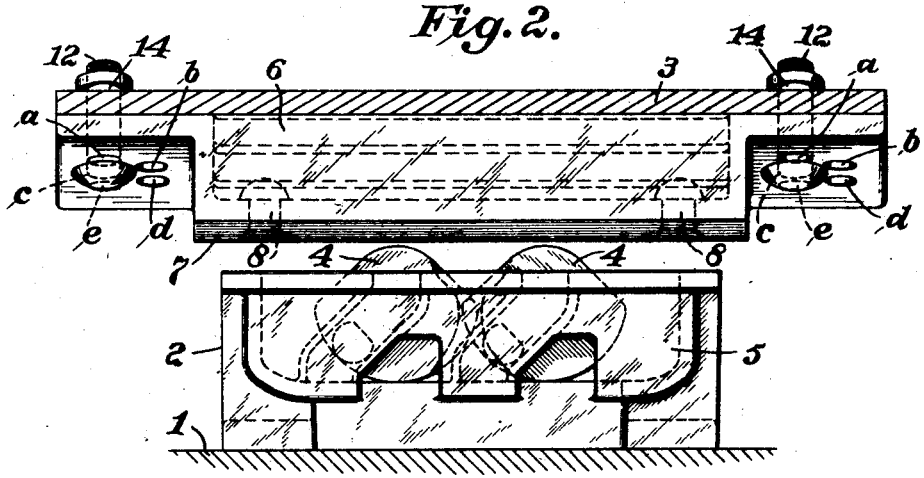
Fig. 2 is a side elevation of the same, the portion of the bolster being shown in section.
Figure 6:
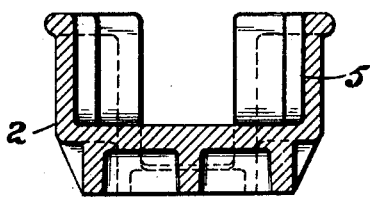
Fig. 6 is a sectional view of the housing for the roller bearings.

Referring now more particularly to the several views, there is shown in Fig. 1 a fragmentary portion of a truck bolster 1, on which there is securely mounted a roller bearing 2 of the well known "Wine" type, the rollers and housing forming the subject matter of a pending application, filed by me on the 15th day of March 1926, bearing Serial No. 94,751.

It might be mentioned at this point that the roller bearing per se is not part of the present invention and any other similar type of side bearing or that part that is placed on the truck might be used with the present bolster bearing.

There will be noticed in Fig. 1, a fragmentary portion 3 of a body bolster, the inclination being clearly shown. It will be understood that the opposite end of the bolster is inclined in the same manner but in the opposite directions and there will be a similar truck and bolster bearing at this other side of the car.

When the truck bearing is mounted on the truck bolster 2, if it is of the "Wine" type as shown, there will be two rollers 4, mounted in the housing 5 and although I have not shown the bolts through the truck bolster, it will be understood that the bearing is rigidly secured, so that the housing of course is relatively fixed with relation to the truck bolster 1.

Figure 7:
Fig. 7 is a cross sectional view of the body bearing and the manner of reinforcing its lower face.

Referring now more specifically to the gist of the invention, there is shown a casting 6, which forms the body bearing while securely riveted on the lower face of this casting is the supplemental or reinforcing plate 7, which may be of hardened steel, rivets 8 being employed that pass through the plate 7 and are headed in the chambers 9, formed within the casting, as may be clearly seen in Fig. 7.

This casting 6 that is preferably rectangular in form but one of the sides 10 is much higher than its opposite side 11, so that the upper surface of the body bearing is an inclined plane. By this construction the whole upper surface will lie flush and contact throughout its length with the incline surface 3 of the truck bolster, as may be seen, especially in Figs. 1 and 3.

Means are provided for adjusting this plate up and down the body bolster 3, but it will be appreciated that the reinforcing plate 7 at all times will lie in the plane parallel with the upper surface of the roller bearings, due to the complementary angles.

The means for adjusting this bearing are shown clearly in Fig. 4, and it will be noticed that at each end there are provided five holes *a*, *b*, *c*, *d*, and *e*. The hole *c* in Fig. 4 is covered, but it will be seen that the bolts 12 are shown as extending through these respective holes *c*.

Of course there will be two holes 13 within the body bolster, approximately centrally of the truck bearing housing 5 and directly over the same while lock washers and nuts 14 will be provided to retain the bolts and the bearing in their locked position.

Referring now for the moment to Fig. 3, there will be seen the different positions that the body bearing may assume. In this Figure 3, I have shown the bearing at its innermost position, the bolts 12 in this instance being passed through the two holes "*a*".

If the bolster settles, or if there are any irregularities in the center plates, or if the certain tolerances in the center plates are such that it is necessary to adjust the wear plate for the proper clearance between the roller bearings and the hardened outer face of the body bearing plate, it is only necessary to remove the bolts 12 from the holes "*a*" and pass them through the next holes "*b*" of the series and this of course will move the body bearing up the inclined side of the body bolster for a distance equal to the distance of the center of one hole above the center of the preceding hole.

As heretofore mentioned, there are always certain tolerances allowed in the center plates, so that it is desirable to have an adjusting means for the body bearing or the truck bearing (preferably the former) to preserve the proper clearances between the rollers and the body bearing, as the bolster may settle from time to time or the truck frame may slightly settle.

By the present invention I make allowances for these differences, so that it is an easy matter to quickly adjust the body bearing with relation to the rollers of the truck bearing.

Furthermore, I take advantage of the natural slope of the body bolster and simply provide means for adjusting the similarly inclined body bearing casting to thereby provide a quickly and readily adjustable bearing.

The casting, that is the body bearing, is relatively light, as it is cored or provided with chambers and at the same time I rivet a hardened steel face plate to the casting, so that the wear plate will withstand the hard usage to which it is subjected.

From the foregoing, it will be seen that I have provided a body side bearing and wear plate wherein the bearing may be quickly and readily adjusted to suit the various conditions throughout the life of the device.

It will be also understood that any preferable form of truck bearing may be used in conjunction with my invention and I do not wish to be in any way limited to the form shown.

Many slight changes might be made without in any way departing from the spirit and scope of the invention.

Having thus described the same what I claim as new and desire to secure by Letters Patent is:

1. A side bearing comprising in part a body bearing, a supplemental wear plate on the outer surface of said body bearing, the upper surface of the body bearing being inclined and adapted to be movably secured along a similarly inclined body bolster, the ends of said body bearing having extending flanges each provided with a series of holes adapted to receive fastening means, fastening means passing through one of each series of holes and through the body bolster and said body bearing thereby capable of being adjusted along the body bolster.

2. A side bearing comprising a truck bearing and a body bearing, the body bearing having a lower face parallel with the truck bearing, an inclined upper face adapted to be secured to the sloping surface of a body bolster, said body bearing provided with two series of holes in each end, one series of holes of each end being in a different plane to the other series, fastening means passing through the predetermined holes in the said body bearing and adapted to pass through the truck bolster whereby a step by step adjustment of the body bearing may be secured to regulate the clearance between the said body bearing and the said truck bearing.

3. A side bearing comprising a body bearing in the shape of a wedge and having wings arranged along the upper surface of the wedge and said wings adapted to lie flat with a body bolster, the inclined surface of the wedge extending at the same angle as the angle of the body bolster, the wings provided with a plurality of openings arranged in spaced relation from each other whereby the wings may be bolted in a step by step manner inwardly or outwardly of the body bolster.

4. A side bearing comprising a truck bearing and a body bearing, the body bearing comprising a wedge shape member, the lower face of which is adapted to remain parallel with the truck bearing, wings extending from the ends of the body bearing and at an incline to the lower surface of the body bearing, a plurality of like spaced holes in each of the said wings, means adapted to pass through said holes and lock the bearing to the bolster and said holes arranged whereby a step by step movement may be had of the body bearing.

5. In combination with a body bolster having a sloping lower surface of a wedge shaped body side bearing having its lower surface horizontal and its top surface shaped to conform to the slope of said body bolster, said body side bearing being provided with ends having plane surfaces throughout their length and provided with holes, means for positioning the body side bearing along the said lower surface of said body bolster, said means incorporating members passing respectively through the holes at the ends of side bearings and the sloping part of the bolster and at right angles thereto.

In testimony whereof I affix my signature.
WILLIAM E. WINE.